United States Patent

Wilkie

[11] Patent Number: 5,885,703
[45] Date of Patent: Mar. 23, 1999

[54] BIAXIALLY ORIENTED POLYPROPYLENE AROMA BARRIER FILM

[75] Inventor: Andrew F. Wilkie, Haverhill, Mass.

[73] Assignee: AEP Industries, Inc., South Hackensack, N.J.

[21] Appl. No.: 699,669

[22] Filed: Aug. 19, 1996

[51] Int. Cl.⁶ ...................................................... B32B 7/02
[52] U.S. Cl. ..................... 428/220; 525/66; 428/DIG. 10
[58] Field of Search ............................... 525/66; 428/220, 428/DIG. 10

[56] References Cited

U.S. PATENT DOCUMENTS

| | | | |
|---|---|---|---|
| 4,410,482 | 10/1983 | Subramanian | 264/515 |
| 4,416,942 | 11/1983 | DiLuccio | 428/332 |
| 4,444,817 | 4/1984 | Subramanian | 428/36 |
| 4,677,006 | 6/1987 | Topolski | 428/35 |
| 4,731,216 | 3/1988 | Topolski | 264/503 |
| 4,880,706 | 11/1989 | Mazuera et al. | 428/516 |
| 4,911,963 | 3/1990 | Lustig et al. | 428/36.91 |
| 4,971,864 | 11/1990 | McCord | 428/516 |
| 5,053,258 | 10/1991 | Booze et al. | 428/36.6 |
| 5,077,109 | 12/1991 | Lustig et al. | 428/36.91 |
| 5,162,422 | 11/1992 | Lausberg et al. | 524/504 |
| 5,230,963 | 7/1993 | Knoerzer | 428/520 |
| 5,330,831 | 7/1994 | Knoerzer et al. | 428/353 |

*Primary Examiner*—Ana Woodward
*Attorney, Agent, or Firm*—Mathews, Collins, Shepherd & Gould, P.A.

[57] ABSTRACT

An aroma barrier layer for a packaging film is provided which contains a homogeneous blend of an amorphous nylon component and a maleic anhydride-modified polyolefin component. The maleic-anhydride content in the polyolefin component and the relative amounts of the two components are selected such that the two components are compatible with one another and the barrier layer constitutes a continuous homogeneous layer substantially free of any platelet formation and distinct layers. Compositions of the homogeneous blend and packaging films including the barrier layer are also provided.

9 Claims, No Drawings

BIAXIALLY ORIENTED POLYPROPYLENE AROMA BARRIER FILM

FIELD OF THE INVENTION

The present invention relates to oriented polyolefin films which provide excellent barriers to light, oxygen, water vapor, flavor and aroma. More particularly, the present invention relates to recyclable films which provide excellent barrier layers to aroma and flavor.

BACKGROUND OF THE INVENTION

There is a growing need in today's marketplace for an economical, transparent packaging material which is an adequate barrier to moisture and oxygen and an excellent barrier to aroma and flavor. In addition, there is a need to provide these qualities in a film that is recyclable and thus environmentally friendly.

Oriented homopolymer polypropylene films provide many packaging advantages, including excellent barrier properties against greases, oils and water vapor. It is known that biaxially oriented polypropylene (BOPP) films can be modified in order to enhance light, oxygen, water vapor, flavor and aroma barrier properties. While many methods of modifying BOPP films are currently known, each has its disadvantage.

The current commercial practices for modifying BOPP film include metallization techniques and coating the film with various components. Typical coating components include polyvinylidiene chloride (PVDC), acrylic acid (AA), and polyvinyl alcohol (PVOH). Each one of these modification procedures requires an out-of-line process and the resulting product in each case is non-recyclable. Metallization of BOPP film by vacuum deposition of a very thin layer of aluminum provides excellent light, oxygen and water vapor barrier properties. Accordingly, such films are used extensively in the salty snack food and bakery markets. Unfortunately, these films do not provide the enhanced flavor and aroma barrier properties sought by many of today's packagers.

PVDC and AA-coated BOPP films have been in existence commercially for many years. Both films have high clarity. High barrier PVDC-coated films are employed when superior oxygen and aroma barrier properties are critical in a clear package. PVDC coatings also improve the water barrier vapor properties of a coated BOPP film. However, one problem with PVDC coatings is that the heat sealability of a PVDC-coated film is dependent on the level of functional comonomer in the latex composition. The higher the comonomer content in the PVDC latex, the better the sealability, but as sealability increases oxygen barrier properties diminish. As a result, very high barrier PVDC coatings are generally non-heat sealable.

Acrylic acid (AA) coatings provide high gloss, good sealability, adhesion enhancement when corona treated, and can be used as a flavor and aroma barrier. Unfortunately, producing AA coatings requires an out-of-line process, as discussed above, and are non-recyclable.

The most recent commercially available coated film technology involves coatings of polyvinylalcohol (PVOH). PVOH coatings are clear and provide excellent oxygen barrier properties, and can also be used as a flavor and aroma barrier to some extent. The oxygen barrier performance, however, is related to relative humidity and exposure to high moisture causes a significant deterioration in the oxygen barrier performance, probably because PVOH coatings are water soluble.

An additional emerging technology for a clear barrier BOPP film is the plasma-enhanced vapor deposition of a very thin layer of silica glass, e.g., $SiO_x$ wherein x can vary in the composition from 0.5 to 4.0. This technology is developmental for BOPP and is not commercially viable at this time due to problems with economics, flex crack resistance, and yellowness. $SiO_x$ coatings also are non-recyclable and thus not preferred for many applications.

A need therefore exists for a BOPP coating which provides excellent light, oxygen, water vapor, flavor and aroma barrier properties, yet is recyclable.

The sciences of water, light and oxygen permeation for BOPP films are generally well understood and have been quantified with commercially available testing equipment. The science of aroma barrier technology, on the other hand, involves more complex molecules, interactions and mechanisms that are not very well understood. Testing equipment is beginning to be commercialized which can quantify and detect permeants and flavors from single as well as multiple sources. The most reliable and basic testing equipment for detection of a permeant, however, is the human nose. The nose can detect odors at very low concentrations but cannot quantify levels in terms of parts per million (ppm) or parts per billion (ppb). However, the human nose can distinguish between slight and strong odors. Given a known permeant, a trained human nose can detect the presence or absence of that permeant with high certainty.

Heterogeneous polymer blends used as barriers to permeation of fluid, liquid and gaseous materials are taught in U.S. Pat. Nos. 4,410,482 and 4,444,817. These patents teach combining a polycondensation polymer with a polyolefin by using an alkylcarboxyl-substituted polyolefin as a compatabilizing material to form a heterogeneous melt. The compositions disclosed comprise 60 to 95% by weight polyolefin, 5 to 40% by weight condensation polymer incompatible with the polyolefin, and 0.25 to 12% by weight alkylcarboxyl polyolefin substituted with an unsaturated monomer having a carboxylic moiety grafted to a polyolefin. The patents teach processes of forming a continuous matrix phase wherein the condensation polymer, which is incompatible with the polyolefin, is present in the form of a discontinuous distribution of thin, substantially two-dimensional, parallel and overlapping layers, and the alkylcarboxyl-substituted polyolefin is present between the matrix and the layers and adheres the matrix and layers together. A relatively thick film results. These processes are known as laminar technology, and are further embellished in U.S. Pat. No. 4,416,942. The disclosures of each of these patents are herein incorporated in their entirety by reference.

While the foregoing permeation barriers find use in many applications, a need still exists for a barrier which is highly impermeable to aromas and flavors. In addition, a need also exists for a continuous homogeneous layer which provides excellent barrier properties in a commercially viable thin BOPP film.

SUMMARY OF THE INVENTION

It is an object of the present invention to provide a BOPP film which has good clarity, good water and oxygen barrier properties, and excellent aroma barrier properties. The present invention is based upon the discovery that a BOPP film having such properties can be achieved by forming a barrier layer which contains a major portion of amorphous nylon blended with a minor portion of maleic anhydride-modified polypropylene. Herein, the term "nylon" generically refers to polyamides as defined, e.g., in Grant &

Hackh's *Chemical Dictionary*, Fifth Edition, from McGraw-Hill, Inc. publishers, 1987. The maleic anhydride serves to compatabilize the amorphous nylon with the polyolefin and to anchor the skin layer to a core layer of, e.g., polypropylene. The barrier layer is preferably a coextruded skin layer and can be biaxially oriented in conventional BOPP production equipment, such as in a tenter frame or by a blown process. The polymer blend provides a skin layer which exhibits flavor, aroma and oxygen barrier properties to the base or core polyolefin layer. The extent of these properties is governed by the amount of amorphous nylon and the thickness of the skin layer. The greater the concentration of amorphous nylon and the thicker the skin layer, the greater the oxygen and aroma barrier properties. Water vapor barrier properties are largely dependent on the thickness of the core layer.

According to a preferred embodiment, the barrier skin layer of the present invention comprises between 50 and 65 percent by weight amorphous nylon and between 35 and 40 percent by weight maleic anhydride-modified polypropylene which contains between about 0.4 and 0.6 percent by weight maleic anhydride. In thin film technology the amorphous nylon concentration is only limited by the adhesion of the skin layer to a core layer. The present barrier films are recyclable, which is a major advantage from both production and environmental aspects.

DETAILED DESCRIPTION OF THE INVENTION

The barrier films of the present invention preferably comprise more than 50 percent by weight amorphous nylon to achieve optimum barrier properties. More preferably, the barrier films are formed from blends comprising between 50 and 65 percent by weight amorphous nylon, with the range of from 55 to 65 percent being even more preferred. A wide range of amorphous nylon content can be used, however, under certain circumstances, such that amounts in the range of from 20 to 75 weight percent is feasible provided a continuous homogeneous layer can be produced. According to a preferred embodiment of the invention, a barrier skin layer is formed from 65 percent by weight amorphous nylon and 35 percent maleic anhydride-modified homopolymer polypropylene having a grafted maleic anhydride content of 0.6 percent by weight. Preferably, the layer is coextruded to a thickness of 15 gauge. However, the compositions of the present invention comprise blends of amorphous nylon and maleic anhydride-modified polyolefin that contain more than 40% by weight amorphous nylon and as much as 99% by weight. More preferably, the inventive compositions comprise between 50 and 99% by weight amorphous nylon. According to an even more preferred embodiment, the compositions of the invention contain blends of amorphous nylon and maleic anhydride-modified polyolefin which constitute homogeneous compatible mixtures of the two components. The composition blends are free of platelet formation and distinct layers of the two components.

One exemplary amorphous nylon barrier resin is available as Selar® PA3426, from DuPont Co. Polymer Products Department. Selar® PA amorphous nylon polymer is produced from the polymerization of isophthalic acid, terephthalic acid, and hexamethylene diamine, and has a density of 1.19 gms/cm$^3$ and a melt flow rate of 15 gms/10 minutes at 275° C., 2160 gms. The Selar® PA resin is supplied in a vacuum sealed, foil lined polyethylene bag in order to prevent moisture pickup prior to an extrusion process.

The maleic anhydride-modified homopolymer polypropylene component of the barrier layer is present in an amount of between 5 and 40 percent by weight based on the total weight of the barrier layer. According to one preferred embodiment, the barrier layer comprises 35 percent by weight of the modified polypropylene and 65 percent by weight amorphous nylon. As an alternative to the maleic anhydride-modified homopolymer polypropylene, the modified polyolefin may instead be a maleic anhydride-modified ethylene propylene random copolymer. One preferred modified polypropylene resin is available from Aristech under the trade name Unite® MP660. Unite® MP660 contains 0.6 percent by weight grafted maleic anhydride and has a melt flow rate of about 100 gms/10 min. at 230° C., 2160 gms. The amount of maleic anhydride in the modified component can vary depending upon the amount of amorphous nylon in the barrier layer. Preferably, the maleic anhydride content ranges from about 0.2 to about 0.8 percent by weight in the modified polyolefin, with the range of 0.4 to 0.6 percent by weight being more preferred, and 0.6 percent by weight being even more preferred for adhesion to an unmodified polyolefin core. Generally, when higher maleic anhydride contents are employed in the modified polyolefin component, less of the component is necessary in the barrier layer composition. The barrier layer-to-core adhesion can be enhanced by adding a minor amount of maleic anhydride-modified polyolefin to the core layer, e.g., about 20 percent by weight or less in the core layer.

According to the present invention, the amorphous nylon component of the barrier layer is compatible with the maleic anhydride-modified polyolefin. Therefore, the coextruded product can be recycled back into itself or commingled with other polyolefins without causing incompatibility or degradation as is experienced with other barrier coatings such as PVDC, acrylic acid, and PVOH coatings.

The barrier layer, often referred to as a barrier skin layer, is coextruded on at least one side of a polyolefin core layer. A preferred polyolefin for the core layer is highly isotactic homopolymer polypropylene. According to some embodiments of the invention, a barrier layer is provided on both sides of the core layer.

In addition to the amorphous nylon and modified polyolefin components of the barrier layer, the barrier layer may further include one or more of the following polymeric components in an amount of up to 45 percent by weight: homopolymer polypropylene; ethylene-propylene random copolymer; and high density polyethylene homopolymer.

The barrier skin layer thickness can range from about 1 to 40 gauge, with 10 to 20 gauge being more preferred. According to one embodiment, a coextruded barrier skin layer having a thickness of 15 gauge is preferred. According to another embodiment, a 15 gauge barrier skin layer is provided on an 80 gauge core layer, and a 5 gauge ethylene-propylene random copolymer skin layer is provided on an opposite surface of the core layer. According to this last-mentioned embodiment and other preferred embodiments, the barrier skin layer preferably comprises 65 percent by weight amorphous nylon and 35 percent by weight maleic anhydride-modified homopolymer polypropylene having a maleic anhydride content of 0.6 percent by weight. According to the same embodiment, the core layer comprises isotactic homopolymer polypropylene and the opposite 5 gauge skin layer has an ethylene content of 5.0 percent by weight in the ethylene-propylene random copolymer. Films according to these embodiments and others can be produced according to the invention via conventional BOPP film manufacturing techniques.

The barrier layer can be further processed to improve anchorage of inks, adhesives, polyolefins and vacuum deposited metal by surface treatment through conventional means such as is common in the industry. Exemplary treatments include corona discharge and gas flame treatments. Vacuum deposition of a very thin layer of metal, particularly aluminum, provides significant improvement to the light, oxygen and water vapor barrier properties. Conventional metallization has not, however, shown to be effective in improving aroma barrier properties.

When the barrier layer is coextruded on only one surface of the polyolefin core, the opposite surface of the core is preferably coextruded with a functional layer.

As discussed above, the core layer preferably comprises isotactic homopolymer polypropylene, however, other polymers may additionally or alternatively be used in the core layer composition. These other polymers include polyolefins, such as ethylene-propylene random copolymers having ethylene contents of between 0.5 and 10 percent by weight, polybutylene homopolymers and copolymers, polyethylenes, high crystallinity homopolymer polypropylenes (HCPP), and blends thereof. Other components which may be incorporated into the core layer include low molecular weight hydrocarbon resins in amounts up to 30 percent by weight, blends of such hydrocarbon resins, primary and/or secondary amides up to 5,000 ppm, stearates up to 5,000 ppm, antistatic agents up to 5,000 ppm, pigments, and cavitating agents. The core layer preferably has a thickness of between 40 and 150 gauge with thicknesses of between 40 and 100 gauge being more preferred and a thickness of about 80 gauge being most preferred for some embodiments.

In addition, the core layer may include water vapor barrier enhancers such as low molecular weight hydrocarbons and high crystallinity polypropylenes. The core layer may also be modified with any of the conventional techniques of cavitation and pigmentation to produce a white opaque or colored film product.

If an opposing skin layer is provided on a surface of the core layer opposite the barrier layer, the opposing skin layer is referred to as a triextruded layer. If an opposing third layer is included, it may function as any of the following: a slip modified layer; a heat-sealable layer; a cold seal adhesion layer; a cold seal release layer; or a high energy bonding layer. Other functional layers may additionally or alternatively be included. The triextruded layer may comprise any of the known heat sealable polyolefins including, but not limited to, propylene copolymers and terpolymers with ethylene and/or butene, copolymers of ethylene and butene, copolymers of butene and ethylene, homopolymer polybutylene, syndiotactic polypropylene, metallocene polyethylenes, and blends thereof. If the triextruded layer is in the form of a heat sealable surface, it is preferably left untreated.

If included, the triextruded layer may instead or additionally be a cohesive receptive layer comprising, for example, polypropylene, ethylene-propylene random copolymer, low density polyethylene, high density polyethylene, or blends thereof. If the triextruded layer provides a cohesive receptive surface, it is preferably treated by corona electric discharge or gas flame treatments to enhance adhesion. The triextruded layer may also or instead comprise slip-modified homopolymer polypropylene or slip-modified ethylene-propylene random copolymer, either of which may contain amides, stearates, antistatic agents, inorganic slip/antiblock agents, silicones, and/or pigments.

With respect to formation of the barrier skin layer, the layer may be interdraw (extrusion) coated between the machine direction orientation station and the tenter (cross) direction orienter. In this case the coextruded layer may be comprised of one or more adhesion promoting materials including polyolefin and maleic anhydride to form a 4-layer film structure. The barrier skin layer may be coextruded onto both sides of the core layer. Each or one barrier skin layer may then be extrusion coated with a slip-modified polyolefin layer, a heat sealable polyolefin layer, a cold seal receptive layer, a cold seal release layer, or a treated bonding layer to yield up to a 5-layer structure. Depending upon the desired thickness of the finished structure, more layers may be included, for example, a metallized layer or other functional layer.

The invention may be more fully understood with reference to the examples set forth below and the results observed from testing those examples. The examples should not be construed as limiting, but rather exemplary of the invention.

EXAMPLES

Aroma barrier skin layers were coextruded with a base (core) layer of isotactic homopolymer polypropylene using conventional ¾ inch and one inch diameter 24:1 length to diameter (L/D) ratio Killion laboratory extruders, respectively. The extruders are equipped with a grooved feed throat and polyethylene type screws with Maddox mixing sections. Standard breaker plates and screen packs were used with each extruder. The polypropylene base layer was about 29 mils (0.029 inch) thick and the coextruded aroma barrier layer was about 5 mils (0.005 inch) thick for a total cast sheet thickness of about 34 mils (0.034 inch). The coextruded layer was processed at a melt temperature (M.T.) of about 530° F. and the core homopolymer polypropylene was processed at about 460° F. M.T. The cast sheet coextrusions were cut into 2 in. by 2 in. squares and then simultaneously biaxially oriented on a T.M. Long laboratory orientation device to six (6) times its dimensional length in both the transverse and machine (extrusion) directions. The finished biaxially oriented total film thickness ranged from about 0.75 to 1.05 mils. The aroma barrier layer thickness ranged from about 0.05 to 0.135 mils.

The formulations for the aroma barrier skin layers are given in Table I. Variable A, 100 WT % homopolymer polypropylene, serves as the coextrusion control. The amorphous nylon (AmNy) barrier component was gradually increased from 25 WT % to 60 WT % and the maleic anhydride-modified polypropylene (MA-PP) compatibilizer component was increased from 5 to 20 WT %, respectively, in Variables B through F. The AmNy was reduced to 30 WT % and two other compatibilizers, a 20 melt flow rate (MFR) anhydride-modified polypropylene having a 0.4 WT % anhydride content, and a 30 MFR anhydride-modified polypropylene having a 0.5 WT % anhydride content, were run in variables G and H, respectively. The AmNy component was further increased in variables I, J, and K to 65, 70 and 75 WT %, respectively, with a constant level of 20 WT % MA-PP containing 0.6 WT % anhydride. Variables I and J also contained 15 and 10 WT % PP homopolymer, respectively.

Variable L repeated the 30 WT % concentration of AmNy with an increased level of MA-PP at 15 WT %. The maximum amounts of AmNy and compatibilizer were run in Variables M, N, and O with the AmNy increasing from 65 to 75 WT % and the MA-PP decreasing from 35 to 25 WT %. Variables CA and CB repeated formulation C using two different compatibilizers, DuPont Bynel® 50E555, a maleic anhydride-modified homopolymer polypropylene, and DuPont Bynel® 50E571 ethylene-propylene random copolymer.

Physical property data including optics, water vapor and oxygen transmission rates are given in Table II. The control homopolymer polypropylene Variable A film shows excellent clarity (0.5–1.5% haze), water vapor barrier (water vapor transmission rate of 0.30–0.33 gms/100 in$^2$), and low oxygen barrier (high $O_2$ transmission rate) (103–123 cc/100 in$^2$). Inventive test Variables B through F showed a haze range of about 1.8–17.2%, which is due primarily to surface roughness. Higher loadings of AmNy and compatibilizer Variables E and F had low haze at 1.8–2.8%. The water vapor transmission rate (WVTR) for Variables B through F ranged from 0.32 to 0.36 gms/100 in$^2$, which is slightly higher than the control film but still considered very good for BOPP film. The slight increase in WVTR (decrease in water vapor barrier property) for the test films is due to the AmNy component. The $O_2$ transmission rate ($O_2$TR) is steadily decreased (improved) from 50 to 21 cc/100 in$^2$ with increasing levels of AmNy (25–60 WT %).

Variables G and H evaluated two different compatibilizers with decreasing percentages of maleic anhydride (0.4 and 0.5 WT %) compared to Variable C (0.6 WT % maleic anhydride). The compatibilizer level was the same for each variable. There was no significant difference in optics, WVTR, and $O_2$TR properties. The low MFR compatibilizers used in Variables CA and CB yielded superior optics to the higher MFR compatibilizers used in Variables C, G, and H. WVTR and $O_2$TR properties were essentially equivalent between the different compatibilizers.

Film Variables I, J, and K showed moderate haze (3.0–5.8%), good water vapor barrier (0.34–0.37 gms/100 in$^2$) and moderate oxygen barrier (16.3–30.8 cc/100 in$^2$). Variable L gave a higher haze range, similar WVTR, and relatively poor $O_2$TR. Film Variables M, N, and O each with maximum levels of compatibilizer, showed a slight improvement in optics compared to Variables I and J, similar WVTR (0.35–0.37 gms/100 in$^2$) and similar $O_2$TR (13.0–38.0 cc/100 in$^2$).

Aroma barrier data on these test variables are presented in Table III. The sensory perception test is conducted by placing a permeant of either solid or liquid in the bottom of a one quart glass Ball jar. A thin film of silicone vacuum grease is smeared on the lip of the glass jar to insure good contact of the film to glass. The film specimen is placed over the mouth of the jar then a neoprene rubber gasket is placed on top of the film. A ring cap is then carefully screwed into place thus sealing the film to the jar and preventing permeant from leaking out from the lip of the jar. The test apparatus is placed in a controlled temperature environment of about 23° C. with ambient relative humidity and barometric pressure.

The films are evaluated for permeation by nasal inspection of the air space just above, but not touching, the film surface. The results of the test are reported in terms of hours to failure. Failure is determined by a positive identification of the permeant vapor inside the jar permeating through the film barrier.

The test permeants included liquids of Toluene, Methyl Ethyl Ketone (MEK), unleaded gasoline, D-limonene and pinene. Toluene simulates diesel fuel vapor, MEK represents ink and adhesive solvents, D-limonene represents lemon citrus oil and pinene represents pine based cleaning solvents. The above permeants are common to everyday life and are generally considered as potential adverse elements to snack food, bakery, and confectionery items protected by flexible packaging.

The homopolymer polypropylene control, Variable A, and the comparison 3 vacuum metallized BOPP films possess relatively little barrier to the above-mentioned permeants. Inventive film Variables B, C, D, E, and F show superior aroma barrier to each of the permeants with increasing levels of AmNy. Variable F (60 WT % AmNy) demonstrated particularly outstanding results.

The inventive films were compared to state-of-the-art aroma barrier BOPP films including comparison 1, which is high barrier PVDC coated on one surface and acrylic coated on the opposite surface, comparison 2, which is 84 gauge thick and also PVDC coated on one surface and acrylic coated on the opposite surface, and comparison 4, which is 84 gauge thick and coated with acrylic on one surface and with PVOH on the opposite surface thereof.

The competitive commercial BOPP films show inferior aroma barrier compared to the inventive barrier films, particularly inventive Variables E (50% AmNy) and F (60% AmNy). However, the comparison 1 film did demonstrate superior barrier to pinene vapor compared to inventive film Variables B through H.

Inventive film Variables I, J, K, L, M, N, and O showed excellent barrier to Toluene vapors far exceeding the state-of-the-art comparison control films.

Next, inventive coextruded barrier skin layer formulations were produced on conventional BOPP tenter frame production equipment using conventional BOPP processing parameters. The coextruded cast sheet was biaxially oriented approximately 4.0× in the machine direction and 9.0× in the transverse direction for an overall orientation ratio of about 36 to 1. The finished film total thickness was maintained at about 1.0 mil (100 gauge). The coextruded skin layer formulations for these production test films are given in Table IV. Film Variables Q, R, and S contain 60 WT % AmNy, 27 WT % MA-PP and 13 WT % high MFR homopolymer PP. Variables T and U increased the MA-PP component up to 29.5 WT % while decreasing the PP homopolymer resin component to 10.5 WT %. The AmNy remained essentially unchanged at 59.5 WT %. The AmNy and MA-PP components were both maximized in inventive film variables V, W, and X at 65 WT % AmNy and 35 WT % MA-PP. The effective barrier resin content was further adjusted by regulating the actual skin thickness. Coextruder skin layer formulation in Variables Q, R, and S was produced at 5.0, 10.0, and 15.0 gauges, respectively, for effective AmNy gauges of 3.0, 6.0, and 9.0. The increased MA-PP coextruder formulation in Variables T, and U was produced at 5.7 and 10.9 gauge, respectively, for AmNy effective thicknesses of 3.4 and 6.5 gauge. The maximized formulation of Variables V, W, and X was produced at 1.2, 15.0, and 21.0 coextruded skin gauges for effective AmNy thicknesses of about 0.8, 9.8, and 13.7 gauges. The control film was 100 gauge conventional homopolymer polypropylene.

The resulting optics, water vapor and oxygen barrier properties for production Variables P through X are given in Table V. Film haze ranged from 5.0 to 7.4% versus the control BOPP film at 1.1% due primarily to the micro rough surface of the AmNy blend. This level of haze is significantly reduced down to about 1.6 to 2.4% when the film is further converted by adhesive or polyethylene extrusion bonding to another substrate as is common in the flexible packaging industry. The water vapor barrier property (WVTR) remained similar to the control (0.32) ranging from 0.30 to 0.36 gms-mil/100 in$^2$/24 hrs. at 100° F., 90% relative humidity (RH). The AmNy skin layer does not add or detract significantly from the excellent WVTR property of the core layer of polypropylene. The oxygen barrier ($O_2$TR) property is improved significantly, reducing the control permeation rate about ninefold from 95 cc/100 in$^2$/24 hrs. at 23° C., 50–75% RH, down to 10.3 cc/100in$^2$ (Variable X). The oxygen barrier increases proportionally with the increase in effective AmNy content in the coextruded skin layer. The oxygen barrier improvement follows the curve of 1/X where X is the oxygen transmission rate of one mil of AmNy. A point of diminishing returns is reached between 5 and 20 gauge effective AmNy where small improvements in oxygen barrier come at a significant increase in the amount of AmNy and, therefore, at a significant increase in the cost of the film. Very high clear film oxygen barrier in the BOPP industry is considered to be ≦1.0 cc/100 in2, and typical BOPP film oxygen barrier properties range from 1.0 to 5.0 cc/100 in$^2$ with a polyvinylidene chloride copolymer latex coating on the base film. This coating is generally applied out-of-line which significantly increases the density of the film and renders the film non-recyclable. Typical PVDC adhesive latexes used to join two flexible packaging BOPP substrates together deliver about 30–50 cc/100 in$^2$ O$_2$TR. The inventive film therefore falls in between very high PVDC coated BOPP film and low barrier PVDC adhesive latexes for oxygen permeability. The inventive aroma barrier film provides a useful non-halogenated (PVDC), reclaimable oxygen barrier to the flexible packaging converter and end user as well.

Aroma barrier results on these production film variables are presented in Table VI. The evaluation method used is the same as described for Table III. Typical production film 100 gauge homopolymer polypropylene was used as one of the controls for this permeation study. The same comparison 1 film from the Table III study served as the other control film. Variable Q, 5 gauge skin (3.0 gauge effective AmNy) demonstrated far superior aroma barrier compared to each control with toluene, unleaded gasoline and D-limonene. Variable R and S, 10 and 15 gauge skins respectively, (6.0 and 9.0 gauge effective AmNy), showed progressively better aroma barrier to each permeant than Variable Q, hence it is demonstrated that aroma barrier is improved with increasing skin thickness at a given concentration of AmNy barrier resin. Variables T and U, 5.7 gauge and 10.9 gauge skin layers, respectively, compare to Variables Q and R with the exception of slightly increased skin layer thickness and MA-PP compatibilizer. The increase in the level of compatibilizer gave generally improved aroma barrier with each variable being significantly improved compared to the controls.

Variables V, W, and X use the maximum ratio of AmNy and MA-PP (65/35 WT %). Variable V was produced with a very thin, 1.2 gauge, skin layer and showed essentially no improvement in aroma barrier compared to the controls. Inventive production Variables W and X both demonstrated far superior aroma barrier compared to the controls. Film Variable X, 21.0 gauge skin layer (13.65 gauge effective AmNy), showed two times the barrier to unleaded gasoline vapor than Variable W, 15.0 gauge skin layer (9.75 gauge effective AmNy), further demonstrating that aroma barrier is dependent on the effective AmNy thickness which in turn is dependent on skin layer thickness and amount of amorphous nylon.

Commercial conventional BOPP production equipment can produce skin layer thicknesses in the range of about 1.0 to 20.0 gauge. The satellite coextruder generally has a smaller diameter extrusion screw relative to the main (core) layer extruder and as a result output is limited. In order to achieve very thick skin layers, at a given coextruder maximum output, line speed must be reduced. Relatively low line speeds combined with high output coextrusion equipment can produce very thick skin layers ≧20 gauge which in turn would yield even superior oxygen and aroma barrier results. A reasonable commercially viable range of barrier skin layer thickness is between 10 and 20 gauge. An alternative method for improving the aroma barrier function of a BOPP film is to coextrude the aroma barrier layer on both sides of the homopolymer polypropylene core thereby increasing the potential amount of AmNy in the structure (i.e., 2×20 gauge).

The maximum amount of AmNy in the skin layer is limited by the adhesion between the skin and core layer. Laboratory studies indicate that skin to core interlayer adhesion is significantly compromised when the AmNy is greater than 65 WT %, with the maximum level of MA-PP (i.e., 70/30 WT % AmNy/MA-PP). The skin/core layer adhesion of Variables T, U, V, W, and X is 110–180 gms/in. Skin layer adhesion results are given in Table VII for Variables T through X. The non-initiated skin adhesion values ranged from 390–540 gms/in. A significant amount of energy is required, however, to initiate skin delamination from the unmodified polypropylene core. Once delamination is initiated the interfacial adhesion values are substantially reduced. Skin layers with more than 70% AmNy show little to no adhesion (<50 gms/in.) to a homopolymer polypropylene (polyolefin core). A very high concentration or monolayer of amorphous nylon would require either a tie layer between the skin and core or a significant amount >20 WT % of the MA-PP in the core layer to provide adequate interlayer adhesion. The interlayer adhesion can be improved by adding up to 20 WT % of the MA-PP resin to the core layer of the film.

The AmNy surfaces of the inventive films, Variables Q through X, demonstrated good coefficient of friction (COF) at about 0.40 dynamic compared to the homopolymer polypropylene control at 0.56 dynamic, as shown in Table VII. A dynamic COF in the range of 0.20–0.40 is generally considered acceptable for good machine performance. The relatively good COF of the non-slip modified AmNy surfaces is attributed to the AmNy resin and to the microrough surface the blend creates.

Inventive film Variables T through X were stress cracked on a Gelbo-Flex machine using up to 500 flex cycles and then tested for O$_2$TR. The results in Table VII show that the inventive AmNy BOPP films demonstrated excellent resistance to flex cracking with little to no increase in oxygen permeability up to 500 flex cracking cycles.

At levels of 50 WT % or more, the amorphous nylon becomes the major component of the blend and thus is observed as a continuous layer rather than discontinuous layers as is taught in the prior art. The commercial and laboratory processes used to manufacture the inventive films described herein provide complete homogenization and compatibilization in the coextruded skin layers thereby destroying any platelet formation. Cross sectional analysis with a differential interference contrast light microscope of the coextruded cast sheet and film demonstrates the homogeneous (non-platelet) formation of the inventive films. The skin layer is substantially free of any platelet formation and free of distinct layers.

TABLE I

Coextruded Aroma Barrier
Skin Layer Formulations (WT %)

| Variable | Homopolymer Polypropylene Hi MFR PP[1] | Amorphous Nylon[2] | Maleic Anhydride Grafted Polypropylene[3] |
|---|---|---|---|
| A (control) | 100 | — | — |
| B | 70 | 25 | 5 |
| C | 60 | 30 | 10 |
| D | 50 | 40 | 10 |
| E | 35 | 50 | 15 |
| F | 20 | 60 | 20 |
| G | 60 | 30 | 10[4] |
| H | 60 | 30 | 10[5] |
| I | 15 | 65 | 20 |
| J | 10 | 70 | 20 |
| K | 5 | 75 | 20 |
| L | 55 | 30 | 15 |
| M | 0 | 65 | 35 |
| N | 0 | 70 | 30 |
| O | 0 | 75 | 25 |
| CA | 60 | 30 | 10[6] |
| CB | 60 | 30 | 10[7] |

[1]Nominal 16 gms/10 min. melt flow rate (MFR)
[2]Produced from polymerization of isophthalic acid, terephthalic acid, and hexamethylene diamine, density of 1.19 gms/cm$^3$, and MFR of approximately 15 gms/10 min. at 275° C., 2160 gms.
[3]100 MFR at 230° C., 2160 gms, 0.6 WT % maleic anhydride
[4]20 MFR, 0.4 WT % maleic anhydride
[5]40 MFR, 0.5 WT % maleic anhydride
[6]Maleic anhydride-modified homopolymer polypropylene, 4.8 MFR, melt point @ 166° C.
[7]Maleic anhydride-modified ethylene-propylene random copolymer, 2.8 MFR, melt point @ 156° C.

TABLE II

Optics, Water Vapor and Oxygen Barrier Data

| Variable | % Haze | WVTR gms-mil/100in$^2$/24 hrs. @ 100° F., 90% RH | O$_2$TR (cc/100in$^2$/24 hrs. @ 235° C., 50–75% RH) |
|---|---|---|---|
| A | 0.5–1.5 | 0.30–0.33 | 103–123 |
| B | 2.2–15.0 | 0.36 | 50 |
| C | 8.2–15.9 | 0.35 | 44 |
| D | 2.8–17.2 | 0.35 | 33 |
| E | 1.8–2.0 | 0.36 | 24 |
| F | 2.3–2.8 | 0.35 | 21 |
| G | 3.5–16.2 | 0.34 | 48 |
| H | 5.2–16.2 | 0.32 | 42 |
| I | 3.0–3.5 | 0.34 | 19.5–30.8 |
| J | 4.2–5.8 | 0.37 | 16.3–22.5 |
| K | 3.5–4.1 | 0.34 | 20.0–23.6 |
| L | 3.0–14.1 | 0.34 | 98.9–110.0 |
| M | 2.2–2.7 | 0.37 | 29.5–38.0 |
| N | 3.5–4.2 | 0.35 | 14.5–18.3 |
| O | 6.0–8.0 | 0.36 | 13.0–21.5 |
| CA | 1.6–6.2 | 0.33 | 37 |
| CB | 2.8 | 0.35 | 46 |

TABLE III

Aroma Barrier Data
Sensory Perception Study
Permeant[1] (time to failure, hours)

| Variable | Toluene | MEK | Unleaded Gas | D-Limonene | Pinene |
|---|---|---|---|---|---|
| A | <0.5 | <1.0 | <0.5 | <2.0 | <5.5 |
| B | — | <7.0 | — | <3.0 | <23.0 |
| C | — | <5.5 | — | <3.0 | <23.0 |
| D | <6.0 | <72.0 | <1.0 | <72.0 | <216 |
| E | <432 | <7.0 | <2.0 | <168.0 | <216 |
| F | ≦456 | <72.0 | <3.0 | ≦312.0 | <360 |
| G | — | — | — | — | — |
| H | — | — | — | — | — |
| I | <792 | — | — | — | — |
| J | >1008 | — | — | — | — |
| K | >1008 | — | — | — | — |
| L | <2.5 | — | — | — | — |
| M | >1008 | — | — | — | — |
| N | >1008 | — | — | — | — |
| O | >1008 | — | — | — | — |
| Comparison 1[2] | <1.0 | <1.0 | <0.25 | <96 | ≧528 |
| Comparison 2[3] | <2.0 | <1.5 | <0.5 | — | — |
| Comparison 3[4] | <1.0 | <2.0 | <0.25 | <1.0 | <23.0 |
| Comparison 4[5] | <2.5 | <3.0 | <0.5 | — | — |

[1]100 ML of permeant liquid is placed in a quart sized Mason (Ball) jar. Film is placed over the vacuum greased lip of the jar then a neoprene rubber gasket is placed on top of the film. The ring top is then screwed in place to secure the film to the jar. The test specimen is placed in a controlled temperature environment of 75° F. at atmospheric relative humidity and pressure. Failure is determined by positive identification of permeant through the film by nasal perception.
[2]87 gauge film, PP core coated with acrylic on one side and PVDC on the opposite side.
[3]84 gauge film, homopolymer PP core coated with acrylic on one side and PVDC on the opposite side.
[4]60 gauge film, BOPP core, vacuum metallized.
[5]84 gauge film, PP core coated with acrylic on one side and PVOH on the opposite side, and including adhesion promoting layers.

TABLE IV

Skin Layer Formulations (WT %)[1]

| Variable | Film Skin Layer Thickness Gauge | Homopolymer Polypropylene | Amorphous Nylon[3] | Maleic Anhydride-Modified Polypropylene[4] |
|---|---|---|---|---|
| P (control) | 5.5 | 100[2] | 0 | 0 |
| Q | 5.0 | 13.0 | 60.0 | 27.0 |
| R | 10.0 | 13.0 | 60.0 | 27.0 |
| S | 15.0 | 13.0 | 60.0 | 27.0 |
| T | 5.7 | 10.5 | 59.5 | 29.5 |
| U | 10.9 | 10.5 | 59.5 | 29.5 |
| V | 1.2 | 0 | 65.0 | 35.0 |
| W | 15.0 | 0 | 65.0 | 35.0 |
| X | 21.0 | 0 | 65.0 | 35.0 |

[1]Core formulation: 98.89 WT % homopolymer polypropylene, 0.11 WT % Nylon 6.
[2]Homopolymer polypropylene, MFR 2.
[3]Produced from polymerization of isophthalic acid, terephthalic acid, and hexamethylene diamine, density of 1.19 gms/cm$^3$, and MFR of approximately 15 gms/10 min. at 275° C., 2160 gms.
[4]100 MFR at 230° C., 2160 gms, 0.6 WT % maleic anhydride.

TABLE V

Optics, Water Vapor and Oxygen Barrier Data

| Variable | % Haze | WVTR (gms-mil/100in$^2$/24 hrs. @ 100° F., 90% RH) | O$_2$TR (cc/100in$^2$/24 hrs. @ 23° C., 50–75% RH) |
|---|---|---|---|
| P (control) | 1.1 | 0.32 | 95 |
| Q | 6.4 | 0.33 | 33 |

TABLE V-continued

Optics, Water Vapor and Oxygen Barrier Data

| Variable | % Haze | WVTR (gms-mil/ 100in²/24 hrs. @ 100° F., 90% RH) | O₂TR (cc/100in²/24 hrs. @ 23° C., 50–75% RH) |
|---|---|---|---|
| R | 5.1 | 0.35 | 20 |
| S | 5.0 | 0.36 | 15 |
| T | 6.2 | 0.33 | 28.0 |
| U | 7.3 | 0.31 | 21.5 |
| V | 7.2 | 0.30 | 63.4 |
| W | 5.9 | 0.37 | 12.9 |
| X | 7.4 | 0.35 | 10.3 |

TABLE VI

AROMA BARRIER DATA SENSORY PERCEPTION STUDY
Permeant[1] (time to failure, hrs.)

| VARIABLE | TOLUENE | MEK | UNLEADED GASOLINE | D-LIMONENE |
|---|---|---|---|---|
| P (control) | <1.0 | <2.0 | <0.5 | <4.0 |
| Q | <29.0 | <2.5 | <2.0 | >408 |
| R | <216.0 | <3.0 | <3.0 | >408 |
| S | <336.0 | <3.0 | <7.0 | >408 |
| T | <192 | <3.5 | <21 | <504 |
| U | <144 | <3.5 | <72 | <504 |
| V | — | <2.0 | <0.5 | <7.0 |
| W | >1008 | <3.5 | <48 | >1008 |
| X | >1008 | <4.0 | <96 | >1008 |
| Comparison 1[2] | <1.0 | <2.0 | <5.0 | <144.0 |

[1]100 ml of permeant liquid is placed in a quart sized Mason (Ball) jar. Film is placed over the vacuum greased lip of the jar then a neoprene rubber gasket is placed on top of the film. The ring top is then screwed in place to secure the film to the jar. The test specimen is placed in a controlled temperature environment of 75° F. at atmospheric relative humidity and pressure. Failure is determined by positive identification of permeant through the film by nasal perception.
[2]87 gauge film, PP core coated with acrylic on one side and PVDC on the opposite side.

TABLE VII

C.O.F.

| Variable | C.O.F. 200 gm TMI Film/Film | Interlayer Adhesion (gms/in.) | | O₂TR (cc/100in²/24 hrs. @ 23° C., 50–75% RH) Gelbo Flex Cracked | | |
|---|---|---|---|---|---|---|
| | | Non-Initiated[1] | Ini-tiated[2] | 0 Cycles | 100 Cycles | 500 Cycles |
| P (control) | 0.41/0.56 | — | — | 96.8 | — | — |
| Q | 0.30/0.41 | — | — | — | — | — |
| R | 0.34/0.42 | — | — | — | — | — |
| S | 0.37/0.41 | — | — | — | — | — |
| T | — | 550 | 180 | 28.0 | 28.3 | 29.2 |
| U | 0.38/0.43 | 540 | 180 | 21.5 | 22.7 | 21.1 |
| V | 0.42/0.49 | 390 | 100 | 63.4 | 63.4 | — |
| W | 0.38/0.41 | 520 | 110 | 12.9 | 13.4 | 12.4 |
| X | 0.33/0.39 | 540 | 120 | 10.3 | 9.9 | 10.1 |

[1]Scotch #610 tape secured to skin layer surface then pulled apart on an Instron tensile testing machine @ 50 in./min.
[2]Skin delaminated initially with a hand pull of Scotch #610 tape then skin/core adhesion measured on an Instron tensile machine at 12 in./min.

Although the present invention has been described in connection with preferred embodiments, it will be appreciated by those skilled in the art that additions, modifications, substitutions and deletions not specifically described may be made without departing from the spirit and scope of the invention defined in the appended claims. For example, although the packaging films of the invention have been described in terms of one, two or three layer films, it is to be understood that films having additional layers such as a metallized layer or other polymeric layers are also within the scope of the present invention.

What is claimed is:

1. A biaxially oriented film comprising an aroma barrier skin layer, said skin layer comprising a homogeneous blend of between 50 and 65% by weight of an amorphous nylon component and a maleic anhydride-modified polyolefin component, said polyolefin component being a polypropylene resin wherein the maleic-anhydride content in the polyolefin component and the relative amounts of both components are selected such that the two components are compatible with one another and said skin layer is a continuous homogeneous layer substantially free of any platelet formation and distinct layers, said skin layer has a thickness of between 10 and 20 gauge.

2. The film of claim 1, wherein said amorphous nylon component constitutes a major portion of said blend and said polyolefin component constitutes a minor portion of said blend.

3. The film of claim 1, wherein said blend comprises between 5 and 40% by weight said modified polyolefin component.

4. The film of claim 1, wherein said polyolefin component contains between 0.2 and 0.8% by weight maleic anhydride.

5. The film of claim 1, wherein said polyolefin component contains between 0.4 and 0.6% by weight maleic anhydride.

6. The film of claim 1, wherein said modified polyolefin component has a maleic anhydride content of about 0.6% by weight, and said blend comprises about 65% by weight said amorphous nylon component and about 35% by weight said modified polyolefin component.

7. The film of claim 1, wherein said amorphous nylon component is produced from the polymerization of isophthalic acid, terephthalic acid, and hexamethylene diamine.

8. The film of claim 1, wherein said amorphous nylon component has a density of 1.19 gms/cm³ and a melt flow rate of 15 gms/10 minutes at 275° C. for 2160 grams.

9. The film of claim 1, wherein said modified polyolefin component contains 0.6% by weight grafted maleic anhydride and a melt flow rate of about 100 gms/10 minutes at 230° C. for 2160 grams.

* * * * *